United States Patent
Sanders et al.

(10) Patent No.: US 12,382,520 B2
(45) Date of Patent: Aug. 5, 2025

(54) SOLAR PANEL TRANSMITTER PAIRING PROCESS

(71) Applicant: Tigo Energy, Inc., Campbell, CA (US)

(72) Inventors: Jeffrey Dwain Sanders, San Jose, CA (US); Eugene Talapa, Campbell, CA (US); Benjamin Victor Duane Henry, Los Gatos, CA (US); Shmuel Arditi, Discovery Bay, CA (US)

(73) Assignee: Tigo Energy, Inc., Campbell, CA (US)

( * ) Notice: Subject to any disclaimer, the term of this patent is extended or adjusted under 35 U.S.C. 154(b) by 95 days.

(21) Appl. No.: 18/505,918

(22) Filed: Nov. 9, 2023

(65) Prior Publication Data

US 2024/0163937 A1     May 16, 2024

Related U.S. Application Data

(60) Provisional application No. 63/424,720, filed on Nov. 11, 2022.

(51) Int. Cl.
*H04W 76/11*     (2018.01)
*H02J 3/38*     (2006.01)
*H04B 3/54*     (2006.01)

(52) U.S. Cl.
CPC ............... *H04W 76/11* (2018.02); *H02J 3/38* (2013.01); *H04B 3/544* (2013.01); *H02J 2300/24* (2020.01)

(58) Field of Classification Search
None
See application file for complete search history.

(56) References Cited

U.S. PATENT DOCUMENTS

| | | | | |
|---|---|---|---|---|
| 9,866,121 | B2* | 1/2018 | Diewald | G01R 21/00 |
| 9,876,360 | B2* | 1/2018 | Kravitz | H02S 50/10 |
| 9,929,665 | B2* | 3/2018 | De Hoog | H02J 13/00017 |
| 9,997,923 | B2* | 6/2018 | Amaratunga | H02J 3/46 |
| 10,097,108 | B2* | 10/2018 | White | H02M 3/04 |
| 10,348,094 | B2* | 7/2019 | White | H02M 7/48 |
| 10,404,060 | B2* | 9/2019 | White | H02S 50/00 |
| 10,483,759 | B2* | 11/2019 | Fishman | H02J 7/35 |
| 10,505,370 | B2* | 12/2019 | Geng | G01R 31/42 |
| 10,523,117 | B2* | 12/2019 | Hume | H02M 1/08 |

(Continued)

FOREIGN PATENT DOCUMENTS

JP     2012049233     3/2012

OTHER PUBLICATIONS

International Search Report and Written Opinion, PCT/US2023/079378, mailed on Mar. 6, 2024.

*Primary Examiner* — Fekadeselassie Girma
(74) *Attorney, Agent, or Firm* — Greenberg Traurig

(57) ABSTRACT

A system includes a modulator configured to generate a communication signal whose modulation represents coded information to be transmitted to a local management unit connected to a photovoltaic module. A local management unit is configured to receive a communication signal whose modulation represents coded information from an inverter or a transmitter. The local management unit is configured to receive a unique pairing sequence; pair to a first transmitter or inverter; and receive communications from the first transmitter or inverter. The local management unit is configured to ignore communications from a second transmitter or inverter that is not paired to the local management unit.

20 Claims, 8 Drawing Sheets

(56) References Cited

U.S. PATENT DOCUMENTS

| | | | |
|---|---|---|---|
| 10,686,316 B2* | 6/2020 | Shuy | H02J 7/34 |
| 10,734,944 B2* | 8/2020 | Friebe | H02S 50/10 |
| 10,833,629 B2* | 11/2020 | Della Sera | H02S 40/32 |
| 10,951,161 B2* | 3/2021 | Freeman | H02S 40/34 |
| 10,992,218 B2* | 4/2021 | Iwazaki | H02M 1/12 |
| 10,998,730 B1* | 5/2021 | Willson | H02S 40/32 |
| 11,036,581 B2* | 6/2021 | Chen | G06F 11/1048 |
| 11,251,621 B1* | 2/2022 | Hume | H02J 7/35 |
| 11,438,988 B1* | 9/2022 | Hume | H05B 47/18 |
| 11,545,931 B2* | 1/2023 | Cummings | H02S 40/345 |
| 11,652,412 B2* | 5/2023 | Yang | H02M 1/007 |
| | | | 307/78 |
| 2004/0032127 A1* | 2/2004 | Tokiwa | H02M 5/458 |
| | | | 290/4 C |
| 2008/0285317 A1* | 11/2008 | Rotzoll | H02J 3/381 |
| | | | 363/80 |
| 2012/0080955 A1* | 4/2012 | Fishman | H02J 3/381 |
| | | | 307/82 |
| 2013/0113302 A1 | 5/2013 | Jeong et al. | |
| 2013/0131884 A1* | 5/2013 | Jain | H02J 3/46 |
| | | | 700/297 |
| 2014/0003110 A1* | 1/2014 | Rothblum | H04B 3/54 |
| | | | 363/140 |
| 2016/0054392 A1* | 2/2016 | Lee | H01M 10/48 |
| | | | 702/63 |
| 2017/0317500 A1* | 11/2017 | Kumar | G01R 31/42 |
| 2018/0041160 A1 | 2/2018 | Lee et al. | |
| 2018/0233908 A1* | 8/2018 | Chik | H02J 3/48 |
| 2020/0176992 A1 | 6/2020 | Kim et al. | |
| 2020/0235592 A1* | 7/2020 | Narla | H02J 7/0031 |
| 2020/0373760 A1* | 11/2020 | Tabuchi | H02J 7/35 |
| 2022/0038050 A1 | 2/2022 | Sella et al. | |

\* cited by examiner

SOLAR PANEL TRANSMITTER PAIRING PROCESS

RELATED APPLICATIONS

This application claims priority to U.S. Provisional Application No. 63/424,720, filed on Nov. 11, 2022, entitled "SOLAR PANEL TRANSMITTER PAIRING PROCESS," the entire contents of which are hereby incorporated by reference.

FIELD OF THE TECHNOLOGY

The present disclosure generally relates to photovoltaic systems, and, more particularly, to generation of transmitter and module level shutdown device (MLSD) pairing signals and protocols transmitted either wirelessly or via power lines.

BACKGROUND

Rapid Shutdown Systems (RSS), optimizers, and microinverters have been used in power generation systems involving photovoltaic panels (e.g., solar panels).

Rapid Shutdown System (RSS), optimizers, and microinverters can be implemented by configuring a transmitter at a location away from the photovoltaic panels to control the photovoltaic panels or the photovoltaic panels output. The transmitter may be standalone, part of an inverter, embedded in one or more Local Management Units (LMUs), or another part of the solar array or facility. A rapid Shutdown System (RSS) can be stand alone or integrated in optimizers, micro-inverters, module level electronics or module level power electronics. Each of these products: standalone RSS, optimizers, microinverters, module level electronics, module level shutdown devices (MLSDs), or module level power electronics can be referred to as a Local Management Unit (LMU). Each photovoltaic panel can have a Local Management Unit (LMU) that controls the operation of the photovoltaic panel or its output. Based on the signals from the transmitter, or the lack of signals from the transmitter, a local management unit or a watchdog of the local management unit, can selectively turn on or off a respective photovoltaic panel or plurality of respective photovoltaic panels. The functionality of turning on or off the respective photovoltaic panel or plurality of respective photovoltaic panels can be accompanied with a discharge of the inverter. A local management unit can be as simple as a signal receiver, a switch and a bypass path. These power line communications, or wireless communication signals, may be a modulation representing coded information.

For example, a string or array of the photovoltaic panels can be connected to power a direct current (DC) power line to provide the electric power generated by the string or array to an inverter that is configured at a convenient location away from the installation site of the photovoltaic panels (e.g., a rooftop). A Power Line Communication (PLC) transmitter can transmit signals onto a power line for transmission to local management units configured on the photovoltaic panels. In another system a wireless transmitter can transmit signals wirelessly for transmission to local management units configured on the photovoltaic panels. Each local management unit can decode the power line communication or wireless signals to perform requested actions, such as turning off a photovoltaic panel, turning off an output from the LMU, continuing power generation, changing an output level of the LMU, or the like.

For example, the PLC or wireless transmitter can transmit a keep-alive message to a Local Management Unit (LMU) to instruct the Local Management Unit (LMU) to begin and/or continue the normal operation of its photovoltaic panel in generating and/or outputting electric power for a predetermined period of time. After the predetermined amount of time, a watchdog of the Local Management Unit (LMU) is configured to automatically turn off if another keep-alive message is not received in a predetermined period to continue the normal operation of its photovoltaic panel.

Alternatively, the transmitter can transmit an accelerated shutdown message to a Local Management Unit (LMU) to instruct the Local Management Unit (LMU) to immediately turn off upon receiving the accelerated shutdown message, thus bypassing the time needed for the watchdog to shut down power.

Thus, when the communication path between the transmitter and the Local Management Unit (LMU) can be used to transmit the accelerated shutdown message, the photovoltaic panel(s) can be turned off rapidly via the transmission of the accelerated shutdown message. If problems occur, such a damaged communication path between the transmitter and the LMU, interference problems, weak signals, etc., the photovoltaic panel can be turned off automatically for the lack of the keep-alive message by the watchdog of the LMU within the predetermined period of time.

For example, remote shutdown can be implemented using watchdog techniques disclosed in U.S. Pat. Nos. 7,884,278, 7,807,919, 8,271,599, 9,124,139, 8,854,193, 9,377,765, 10,063,056, 8,933,321, 8,823,218, 9,397,612, 9,813,021, 10,256,770, and 10,312,857, the entire disclosures of which are incorporated herein by reference. Alternatively, a wireless communication may be used to transmit the keep-alive, on or off signal.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
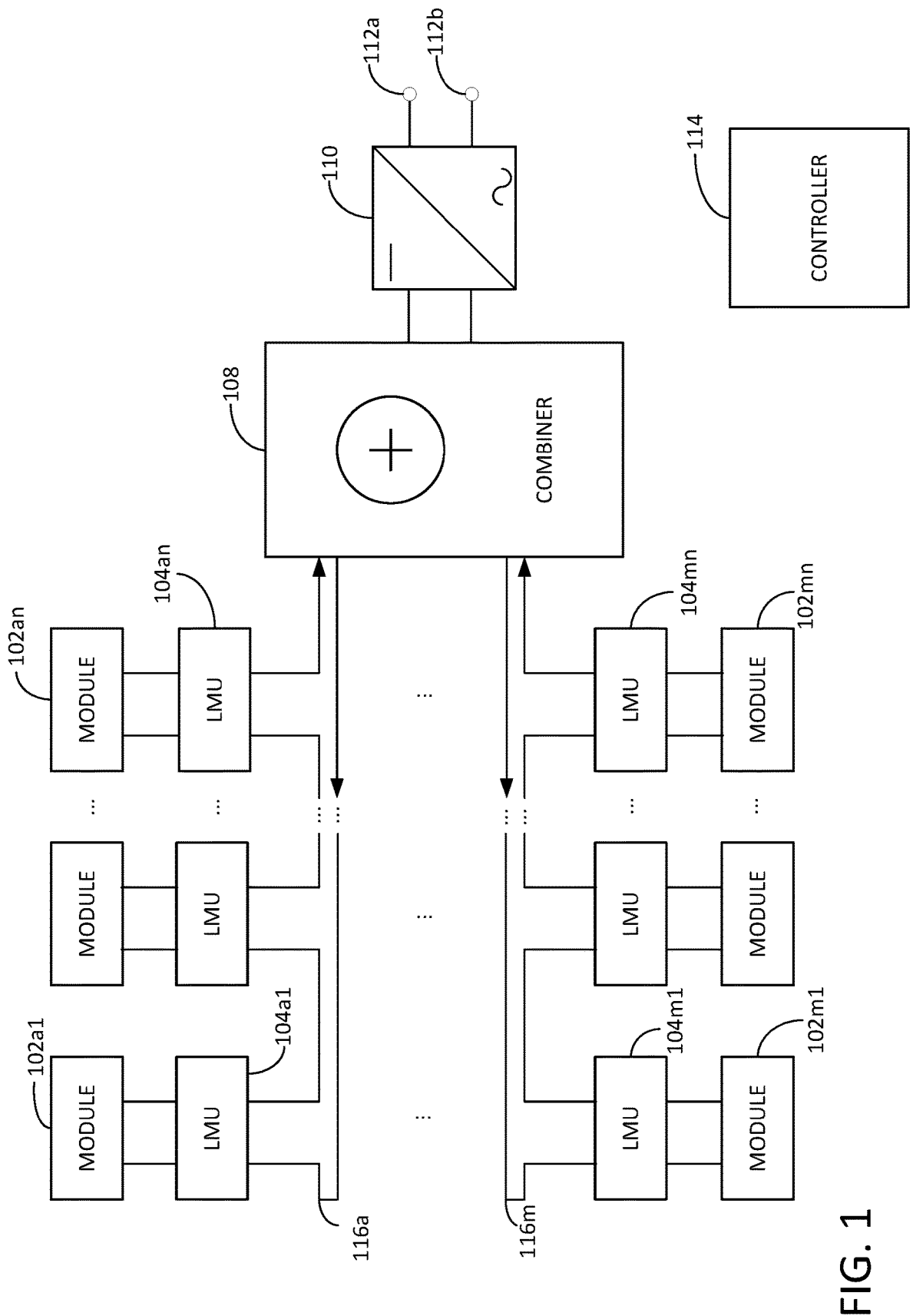
FIG. 1 is a schematic structural diagram illustrating strings of photovoltaic cells in a photovoltaic array, according to some embodiments.

The present disclosure relates to a power line or wireless communication. Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

A large installation of photovoltaic panels can involve multiple sets of power lines connected to multiple strings or groups of photovoltaic panels respectively. In another configuration, installation of photovoltaic panels can involve multiple sets of wireless or PLC transmitters to multiple strings or groups of photovoltaic panels respectively. The power lines of the different strings or groups may be disposed in a vicinity of each other, such as sharing the same conduit or run next to each other in parallel over a distance. Such an arrangement can result in crosstalk, where changes in the magnetic field caused by a signal transmitted on one power line induces a corresponding signal on another closely disposed power line. Alternatively, power lines, even if farther apart, can induce a signal through an electric field. Crosstalk may occur through radio transmission/reception as well. The crosstalk may occur between two wireless signals of two transmitters located in some vicinity to each other. In some other examples, the crosstalk may occur between two solar power lines carrying PLC signals running in proximity to each other. In some other examples, the crosstalk may occur by power cables form a large loop antenna, which is a portion or a combination of a wavelength of the frequencies used in some PLC or other transmitter signals. The induced signal by the crosstalk or by other phenomenon may be recognized by an unintended LMU as a command. As a result, a transmitter in an adjacent solar array may turn on or off an unintended solar array (an array it is not supposed to control) or LMU. For example, if only a few LMUs are unintentionally turned off in an array, they will be subject to the power of the remaining array and may get damaged or burned.

In some other examples, the crosstalk signal may cancel, weaken, or disrupt the desired transmitted signals. The interference from the induced signal can result in errors in demodulating and decoding signals along with other unintended behaviors. As a result, a transmitter in an adjacent solar array may turn on or off an unintended solar array (an array it is not supposed to control) or LMU. Such incident will degrade the solar array's reliability.

In another example, if only a few LMUs are unintendedly turned off in an array, they may attempt to discharge other solar panels still producing power. This can result in damaged RSDs, thermal events, loss of power, and loss of revenue from loss of power.

In another example, if a transmitter stops sending the keep alive signal, the expectation is that the solar modules of that array will be turned off. But if some of the LMUs in the turned off solar array receive a keep alive signal from a nearby transmitter, that array or part of it will stay on. This can be dangerous if fire fighters or maintenance crew members are working on or near a solar array that was supposed to be turned off, but is unexpectedly active or partially active.

In the same manner few solar array wireless transmitters can cancel, weaken, or disrupt the desired transmitted signals.

Embodiments of this disclosure relate to an improved power line communication (PLC) system or wireless communication system for a solar array including pairing (assigning) each LMU or a group of LMUs to a specific transmitter or group of transmitters. In some embodiments, a group of transmitters can be referred to as intended transmitters. In some embodiments, the LMUs can execute commands from the transmitter or transmitters they were paired with (assigned to) and can disregard communications from any other transmitters. Such embodiments may be achieved by pairing transmitters with the LMUs. In some embodiments, the transmitter pairing may be at an LMU level, a string level, an inverter level, a roof level, a location level, or any combination of these levels.

FIG. 1 is a schematic structural diagram illustrating strings of photovoltaic (PV) modules 102 in a PV array, according to some embodiments.

PV modules 102a1 through 102an may each hold one or more PV cells. A group of PV modules 102a1 through 102an connected together can be referred to as a string of PV modules or a string of solar modules. Strings of PV modules 102 can be wired in series via a "string" or power bus 116a through 116m to produce a required output voltage. A PV array, or solar array, may contain multiple strings 116a through 116m of PV modules 102a1 through 102an.

PV modules 102a1 through 102an may be connected to the strings 116a through 116m via local management units (LMUs) 104a1 through 104an, respectively. The LMUs 104a1 through 104an may also be referred to as solar module controllers, solar module converters, or link module units. The LMUs 104a1 through 104an may include a solar module controller to control the operation of the PV module, to monitor a status of the respective PV module, and to link the respective PV module to the serial power bus for energy delivery and safety. The LMUs 104a1 through 104an may also perform filtering and DC conversion, e.g., to buck or boost a module output voltage to a desired string voltage, of the power output by their respective solar modules to the strings.

In some embodiments, the LMUs 104a1 through 104an may use the power bus for sending data and communications. In some embodiments, the LMUs 104a1 through 104an may be connected to a separate communication network, either via wires or wirelessly. In some embodiments, the LMUs 104a1 through 104an may use the power bus and one or more of a wired or wireless network for sending data and communications. In some embodiments, an LMU may be configured to operate more than one PV module. For example, an LMU could be configured to operate each solar panel in a solar array, where each solar panel includes two or more solar modules.

The LMUs 104a1 through 104an may be connected on one side to the solar modules 102a1 through 102an in parallel, and on the other side in series to strings 116a through 116m. The LMUs 104a1 through 104an may receive different types of input communications, for example, a requested duty cycle, which can be expressed as a percentage (e.g., from 0% to 100%) of time the solar module is to be connected to the serial power bus, a phase shift in degrees (e.g., from 0 degrees to 180 degrees), a timing or synchronization pulse, a pairing communication, or combinations thereof. These inputs can be supplied, for example, as discrete signals, or can be supplied as data on a network, or composite signals sent through the power lines 116a to 116m, or wirelessly, and in yet other cases, as a combination of any of these input types.

In some embodiments, the LMUs 104a1 through 104an may also monitor a status of the PV modules 102a1 through 102an, for example, by monitoring sensors which give operating parameters of the module such as voltage, current, temperature, combinations thereof, or the like. In some embodiments, the LMUs 104a1 through 104an may also monitor local meteorological conditions, for example, such as solar irradiance, air temperature, and the like. The LMUs 104a1 through 104an may be configured to optimize an operation of their respective PV module using the status of the PV module determined by the monitoring.

In some embodiments, the LMUs 104a1 through 104an can shut down the solar module based on one or more triggers determined by the monitoring, for example, an overvoltage, a high temperature, or the like, or based on an emergency shutdown signal received from the controller 114. In some embodiments, the controller 114 may output a system OK signal, and the LMUs 104a1 through 104an shut down their respective solar module if the system OK signal is not received for a predetermined period of time, for example, 10 seconds.

In some embodiments, the LMUs 104a1 through 104an may communicate the status of the solar modules 102a1 through 102an and local meteorological conditions to a controller 114. The controller 114 may then determine and generate the input communications for driving the LMUs, for example, a duty cycle, a phase shift, a timing or synchronization pulse, a pairing communication, combinations thereof, or the like, based at least in part on the statuses of the PV modules and the meteorological conditions to optimize a performance of the solar array.

In some embodiments, the controller 114 can cause the LMUs 104a1 through 104an to shut down their respective PV module based on one or more triggers determined by the monitoring, for example, an overvoltage, a high temperature, or the like, or based on an emergency shutdown signal generated by and sent from the controller 114. The controller 114 generates and sends the emergency shutdown signal, which may be based on an overvoltage in a combiner or an inverter, a condition at connectors 112a and 112b, for example, to a main power grid or local system, or an external factor, such as a fire alarm, seismic alarm, or the like. In some embodiments, the controller may generate and output a system OK signal, and the LMUs 104a1 through 104an shut down their respective solar module automatically if the system OK signal is not received for a predetermined period of time, for example, 10 seconds.

The strings 116a through 116m are collected in combiner 108. The combiner 108 collects the DC power from the strings 116a through 116m and supplies DC power to a central inverter 110. The inverter 110 may have filters and capacitors on the input side. A capacitance of the central inverter 110 varies by application; however, in general, there is a very large capacitance on the input side of an inverter in solar energy applications. Even when the system is shutdown, for example, when a power grid to which the solar array is supplying energy is shutdown, a problem remains that the capacitors on the input side of the central inverter may still be holding a dangerous amount of charge.

The controller 114 may include a microcontroller or small single chip microcontroller (SCMC), for example, or may be implemented using an Application-Specific Integrated Circuit (ASIC), Field-Programmable Gate Array (FPGA), or other programmable logic. The controller 114 can even be implemented in discrete, functionally equivalent circuitry, or in other cases a combination of SCMC and discrete circuitry.

The controller 114 may be a stand-alone unit, or may be integrated with the combiner 108, with the inverter 110, or with both the combiner and the inverter into a single unit. In some embodiments, the controller 114 is integrated with the inverter 110, monitors a performance of the inverter 110, determines and tracks a maximum power point, and controls the LMUs 104a1 through 104an based on, at least in part, the maximum power point. Further, while depicted as a logical unit for purposes of this disclosure, the controller 114 may be a distributed device.

For example, the controller 114 could include maximum power point tracking (MPPT) circuitry integrated with inverter 110, local control circuitry integrated with LMUs 104a1 through 104an or with the individual PV modules 102a1 through 102an, and a stand-alone microcontroller unit (MCU) which communicates with and controls the MPPT and local circuit elements. The MPPT calculations by the MCU may be performed, for example, using one or more known MPPT algorithms such as perturb-and-observe, incremental conductance, current sweep, or constant voltage. The MPPT algorithms find the operating voltage that allows a maximum power output from the inverter. The controller 114 could also include multiple controllers, for example, with each controller being responsible for a string, or for one or more solar modules on a solar panel.

In some embodiments, a transmitter, inverter, or dedicated device for pairing (collectively referred to as the "pairing device") that connects directly to a string and/or wirelessly to a transmitter or inverter can be an apparatus that is capable of sending a message to an LMU. In some embodiments, this can facilitate two way communication between the pairing device and the LMUs.

In some embodiments, the pairing device can include a universal asynchronous receiver/transmitter (UART) or a universal synchronous/asynchronous receiver/transmitter (USART); a parallel in to serial out shift register; suitable combinations thereof, or the like. In some embodiments, the pairing device can be configured with or without start/stop bits (depending on oscillator accuracy versus baud rate); with or without parity bits; or the like. In some embodiments, a UART transmission pin can be connected to a transistor, such as, but not limited to a field effect transistor (FET) in the pairing device that can be used to short out or discharge the string's signal voltage. In some embodiments, the pairing device and an LMU can have transmit and receive capabilities. In some embodiments, both the pairing device and the LMU can be transceivers. In some embodiments, the LMU can respond to the pairing device in several ways. In some embodiments, the pairing device may not be a PLC transmitter, primarily because this can avoid crosstalk. In some embodiments the pairing device can be a hand-held commissioning device. In some embodiments, the pairing device can rely upon wireless communication methods such as, but not limited to, Bluetooth, cellular transmission, Wi-Fi, combinations thereof, or the like.

In some embodiments, a standalone transmitter may not receive responses, but the pairing device does receive and decode responses.

In some embodiments, the LMU can send a response by sending a message, by changing its signal voltage, or by suitable combinations thereof. Both can be forms of transmission. In some embodiments, the "transmitter" can receive a response, by a bit stream, by measuring the string safety voltage, or suitable combinations thereof. In some embodiments, measuring the string safety voltage cause the LMU to be a transceiver instead of a transmitter.

In some embodiments, the transmitter and the LMU may be transceivers.

In some embodiments, a power rating of the FET can be determined by the number of strings connected and the current sourced by the LMUs. For example, in some embodiments, if there is one string, the LMUs can source 400 mA, and the string voltage does not exceed 30 V for safety concerns, then the FET should be rated for at least 12 W with proper heat management. In some embodiments, if the pairing device is rated to pair two strings with the LMUs sourcing 400 mA, the FET should be rated for at least 24 W.

In some embodiments, the pairing apparatus can check first that the string voltage is <=30 V. In some embodiments, if the string voltage is greater than 30 V, it is likely that LMUs are producing power and the pairing apparatus can signal a high voltage fault for safety concerns. In some embodiments, if the voltage is <=30V, the pairing device can try to momentarily short out the string signal voltage to measure string current. In some embodiments, if the string current is above the rating of the pairing apparatus, a high current fault can stop the pairing process for safety.

In some embodiments, the pairing device can work in conjunction with non-power producing LMUs that turn on their signal voltages. For example, in some embodiments, the pairing device can short out the composite string(s)' signal voltage, which can produce a serialized message at the baud rate specified by the UART that can be demodulated by the LMU(s) to be paired.

In some embodiments, two way communication from an LMU to a pairing device is also possible. Provided that non-transmitting LMUs continue to produce a signal voltage, the transmitting LMU may connect a UART transmission pin to a transistor such as but not limited to MOSFET or JFET, such as a string discharge FET in an MLSD, to respond to a message from a pairing device or to send data at the request of a transmitter or inverter such as MLSD health, power production, signal dropout count, max signal dropout time, min/max signal PLC signal strength, etc.

In some embodiments, two way communication could follow a protocol where the pairing device, inverter, or PLC transmitter can act as a master and LMUs can act as slaves which are queried for slaveID by the master for various information or acknowledgements.

In both cases, the receive pin of a UART can be connected to a selectable shunt resistor, depending on signal strength current, to decode messages from a pairing device, or even another LMU.

In some embodiments, a gateway or master communication device can broadcast a unique code to all LMUs in a system. In a discovery mode, the unique code can be reported in place of or along with a MacID or the like. The gateway or master communication device can compare the unique code as reported and determine whether to accept the responding device based on whether a match is identified.

In some embodiments, in addition to being used for pairing devices, the present disclosure can be used to remotely update components of the photovoltaic solar array system.

The embodiment of FIG. 1 is a common arrangement of a photovoltaic solar array system, wherein the solar modules 102a1 through 102an supply DC power to the strings 116a through 116m. The power is collected by the combiner 108, and then supplied to the inverter 110. While this is one arrangement with which the teachings of the present disclosure may be practiced, it is not the only such arrangement.

In some embodiments, pairing between a transmitter and the LMUs 104 can be achieved by programming the LMUs 104a1 through 104an with specific transmitter codes. In such embodiments, the transmitter can have a unique identification code or serial number that can be identified by an installer or any other interested party. In some embodiments, the unique identification code or serial number can be a MacID; a serial number; a radio frequency identifier (RFID); near field communication (NFC); a barcode; a QR code; a unique code of the transmitter (other than the MacID); a derivative of the MacID or of the unique code; a combination generated from the MacID or from the unique code; other manners of identifying a transmitter or group of transmitters from a plurality of transmitters; or any combination thereof. In some embodiments, the unique identification code or serial number can be added to a transmitter communication (added to the coded modulation) and the LMUs 104a1 through 104an react to communication from the specific transmitter assigned to the respective one of the LMUs 104a1 through 104an and the LMUs 104a1 through 104an disregard any communication from any other transmitter.

In some embodiments, the unique identification code or serial number can be added to the LMUs 104a1 through 104an before, during, or after the solar array is installed.

In some embodiments, a single string can be connected to a transmitter, and then a pairing sequence can be initiated between the single string and the transmitter. In some embodiments, the unique identification code or serial number of the transmitter may be sent to the LMUs to be paired. In some embodiments, once the string pairing sequence is complete, a verification process can be used to verify that the intended LMUs got paired to the transmitter and not other LMUs (i.e., unintended).

In some embodiments, after completing a verification process on a paired string, the paired string can be disconnected from the transmitter and another string may be connected and paired. In some embodiments, the pairing sequence can be repeated until all intended LMUs are paired. In some embodiments, the pairing sequence can be repeated until all selected LMUs are paired and a confirmation sequence to verify that all intended LMUs are paired and no unintended LMUs were paired. In some embodiments, the pairing device can include a list of serial numbers of paired LMUs and the pairing device can send a request for the pairing ID of each LMU in its list. In some embodiments, the LMU can transmit its pairing ID back to the pairing device in the same manner the pairing device sends a transmission. In some embodiments, the pairing device compares its own pairing ID with the LMU's pairing ID. In some embodiments, if there is a match, paring is complete. In some embodiments, if there is no match, the pairing process is repeated for that LMU. The process continues until all LMUs have been verified.

In some embodiments, a string need not be paired. That is, in some embodiments, an inverter (instead of a string) can be paired with a transmitter.

In some embodiments, a pairing technique can include disconnecting a single string from an inverter. In some embodiments, the LMUs can be configured to accept a pairing sequence when there is no current flow in the string. In some embodiments, the LMUs may be programmed when the current in the string is above or below a defined current level. In some embodiments, the LMUs may be configured to start a pairing process in response to a current of a string being in a predetermined sequence. In some embodiments, the LMUs can be programmed with the unique identification code or serial number of the transmitter. In some embodiments, the pairing sequence can be repeated for different transmitters because some LMUs may be configured to respond to more than one transmitter.

In some embodiments, a list of LMU identifiers can be provided to the transmitter.

In some embodiments, a pairing sequence can include connecting a single string to the inverter. In some embodiments, the LMUs can be configured to accept the pairing sequence when there is current flow in the string. In some embodiments, the LMUs can be programmed when the current in the string is above or below a defined current level. In some embodiments, the LMUs can be programmed with the unique identification code or serial number of that transmitter. In some embodiments, the pairing sequence can be repeated for all transmitters to which the LMU is configured to be responsive.

In some embodiments, a pairing sequence can use a barcode, a QR code, or any other scannable code. In some embodiments, the scannable code can be scanned or added into a device such as, but not limited to, a smartphone, tablet device, wearable smart device, laptop computer, or the like. In some embodiments, the scanning can happen before, during, or after the installation of the solar array. In some embodiments, the unique identification code or serial number for the transmitter or LMUs can be printed on the shipping box, labels, on the LMU, the transmitter, combinations thereof, or the like.

In some embodiments, a scannable code such as, but not limited to, a barcode; a QR code; or any other scannable code can be used to select a particular single LMU from other LMUs. In such embodiments, the code may be scanned or added into a computing device such as a smartphone, tablet device, wearable device, or the like. When the computing device scans the code, the smartphone can match the scanned code with an LMU having a corresponding code. Subsequently, a connection can be made to the specific, matching LMU to program that LMU with a specific transmitter or inverter address. This address could be a module address, a string address, an array address, combinations thereof, or the like. In some embodiments, the scanning may happen before, during, or after the solar array installation. The transmitter or LMU serial numbers could be printed on the shipping box, labels, barcodes, QR codes on the LMU, or transmitter itself.

In some embodiments, if the scannable code is scanned after the LMUs are installed on a PV panel, the computing device can record the Global Navigation Satellite Systems (GNSS) coordinates of the panel and the LMU to create a digital representation of the topology of the array.

In some embodiments, a pairing sequence can include programming a transmitter pairing code directly into the LMU using communication such as, but not limited to, Bluetooth or other close range communication protocol, any other PLC or wireless communication protocol, or combinations thereof. In some embodiments, after pairing the LMU or other receiver to a specific transmitter, the pairing addresses for each specific module, along with their associated serial numbers, may be uploaded or stored in an associated database that can be used to shutdown specific groups of LMUs. In some embodiments, this pairing sequence can be performed before installation or after installation (ground mount with easy access to view barcode of unit) by powering the receiver.

In some embodiments, a verification process can be performed after the pairing sequences are executed to verify that the pairing process was successful and without any mistakes.

In some embodiments, a verification process can include sending voltage to specific LMUs, strings of LMUs, or any other grouping of LMUs. In some embodiments, the controller can measure the voltage of a PV string or array and calculate whether the activate code arrive at the number of LMUs intended.

In some embodiments, a verification process can include sending a keep alive signal to an LMU or group of LMUs. In some embodiments, the controller can measure the voltage of a PV string or array and calculate whether the activate code arrive at the number of LMUs intended.

In some embodiments, a verification process can include disabling a keep alive signal to an LMU or group of LMUs. In some embodiments, the controller can measure the voltage of a PV string or array and calculate whether the activate code arrive at the number of LMUs intended.

In some embodiments, the verification process can include a combination of the above methods.

In some embodiments, all LMUs connected to a string or an inverter may be enabled or disabled to verify the pairing is correct.

Figure 2:
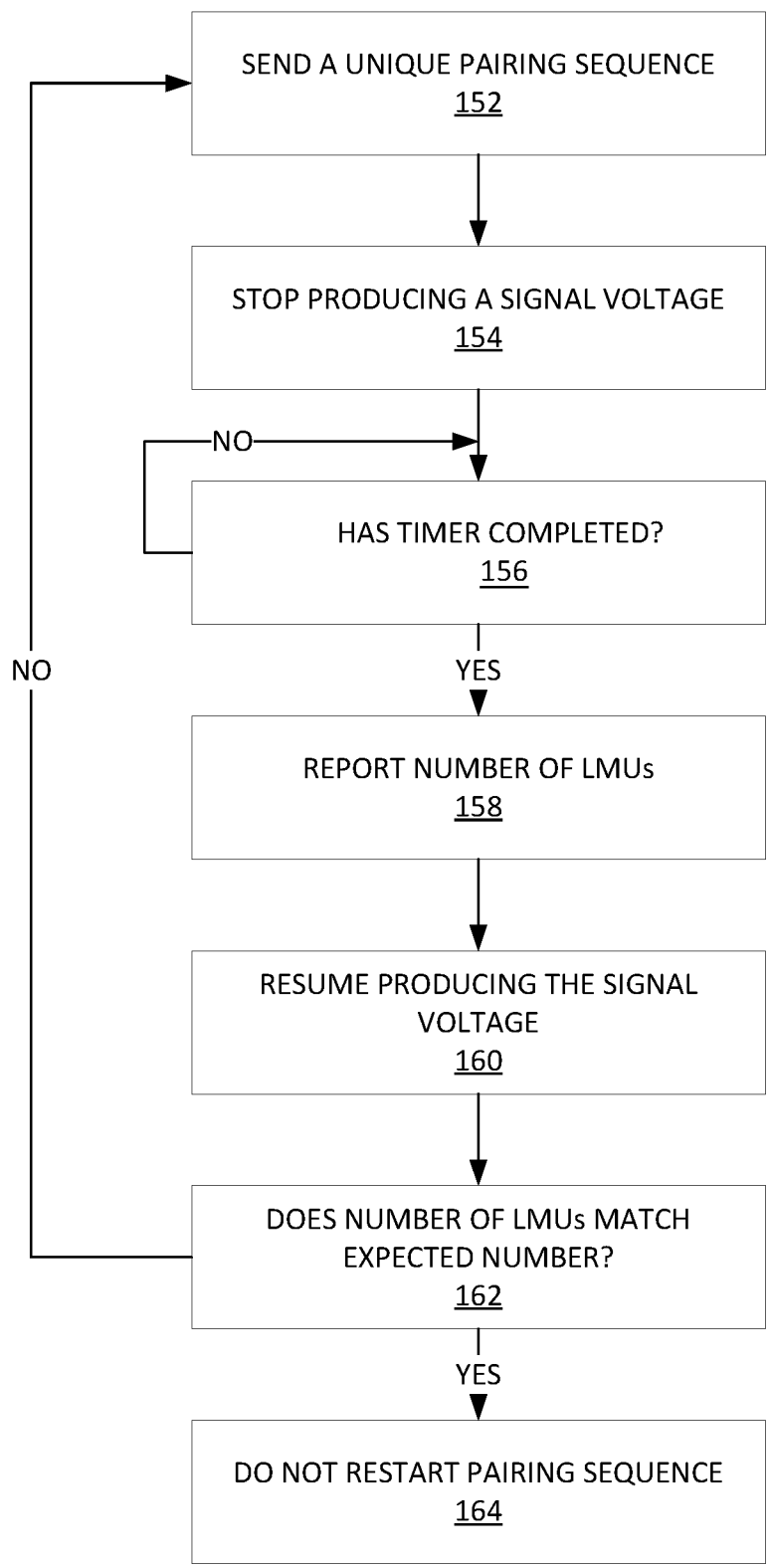
FIG. 2 shows a flowchart for a method of pairing and validating the pairing of LMUs based on pairing requests from a transmitter or inverter and measuring voltage drop, according to some embodiments.

FIG. 2 shows a flowchart for a method 150 of pairing LMUs based on pairing requests from a transmitter or inverter, according to some embodiments. It is to be appreciated that the pairing requests can, in some embodiments, alternatively come from a master LMU instead of from the transmitter or inverter.

At block 152, a pairing sequence is sent to the LMUs. In some embodiments, the unique pairing sequence can be sent from a transmitter, from an inverter, or from a master LMU. In some embodiments, the unique pairing sequence can include a sequence understood by the LMUs. In some embodiments, the unique pairing sequence can include a custom sequence, a sequence defined by the International Electrotechnical Commission (IEC), a sequence defined by the SunSpec Alliance (SunSpec), or the like. In some embodiments, the sequence can be an 11-Bit Barker, an inverted 11-Bit Barker sequence, or any combination of Barker sequences.

In some embodiments, the unique pairing sequence at block 152 can be sent multiple times before the method continues to block 154. For example, in some embodiments, the unique pairing sequence can be transmitted three times before the LMUs having received the unique pairing sequence acknowledge the pairing sequence and continue at block 154. In some embodiments, the unique pairing sequence at block 152 can be transmitted multiple times within a limited period, e.g., one minute or the like. If the unique pairing sequence is not received multiple times within that time period, the method 150 terminates.

At block 154, the LMUs stop producing a signal voltage. In some embodiments, the LMUs stop producing a voltage if they received the unique pairing sequence in block 152. In some embodiments, if the LMU did not receive the unique pairing sequence, the LMU may continue to produce the signal voltage. In some embodiments, the stopping of the signal voltage can be for a predetermined period of time. In some embodiments, this can be representative of an acknowledgment that the pairing process is beginning. In some embodiments, a length of time for the predetermined length of time can be based on the timing of a logic bit or chip and may include a number of bits or allow enough time for all LMUs to acknowledge the pairing sequence. At block 154, the transmitter, inverter, or master LMU can initiate a timer to monitor the predetermined period of time.

At block 156, the transmitter, inverter, or master LMU can verify whether the timer is completed. If the timer has not completed, the method 150 may continue to check the timer for completion at block 156. In some embodiments, if the determination is that the timer has completed, the method 150 can continue to block 158.

At block 158, the inverter or master LMU can measure voltage and report a number of LMUs producing a signal voltage. In some embodiments, the number of LMUs can be preset in the transmitter, inverter, or master LMU. In some embodiments, the number of LMUs can be determined based on taking voltage measurements during the shutdown period and the voltage production period. In some embodiments, the number of LMUs can also be determined by measuring the signal voltage just before the pairing process begins. Comparing the signal voltage before the pairing process with a response during the pairing process can provide feedback to determine a response from responding LMUs.

At block 160, the LMUs resume production of the signal voltage.

At block 162, the transmitter, inverter, or master LMU can determine whether the number of LMUs matches an expected number of LMUs. If the number of LMUs does not match the expected number, the method 150 can be restarted so that the pairing sequence is executed again.

At block 164, in response to determining the number of LMUs matches the expected number of LMUs, the method 150 can terminate and no further pairing sequence is initiated. Optionally, in some embodiments, an output such as, but not limited to, a report indicating whether the pairing process was successful or not can be provided.

In some embodiments, the pairing process described in FIG. 2 can be done with a full solar module voltage and signal voltage. In some embodiments, the pairing process described in FIG. 2 can be done with a portion of the solar module voltage and signal voltage.

Figure 3:
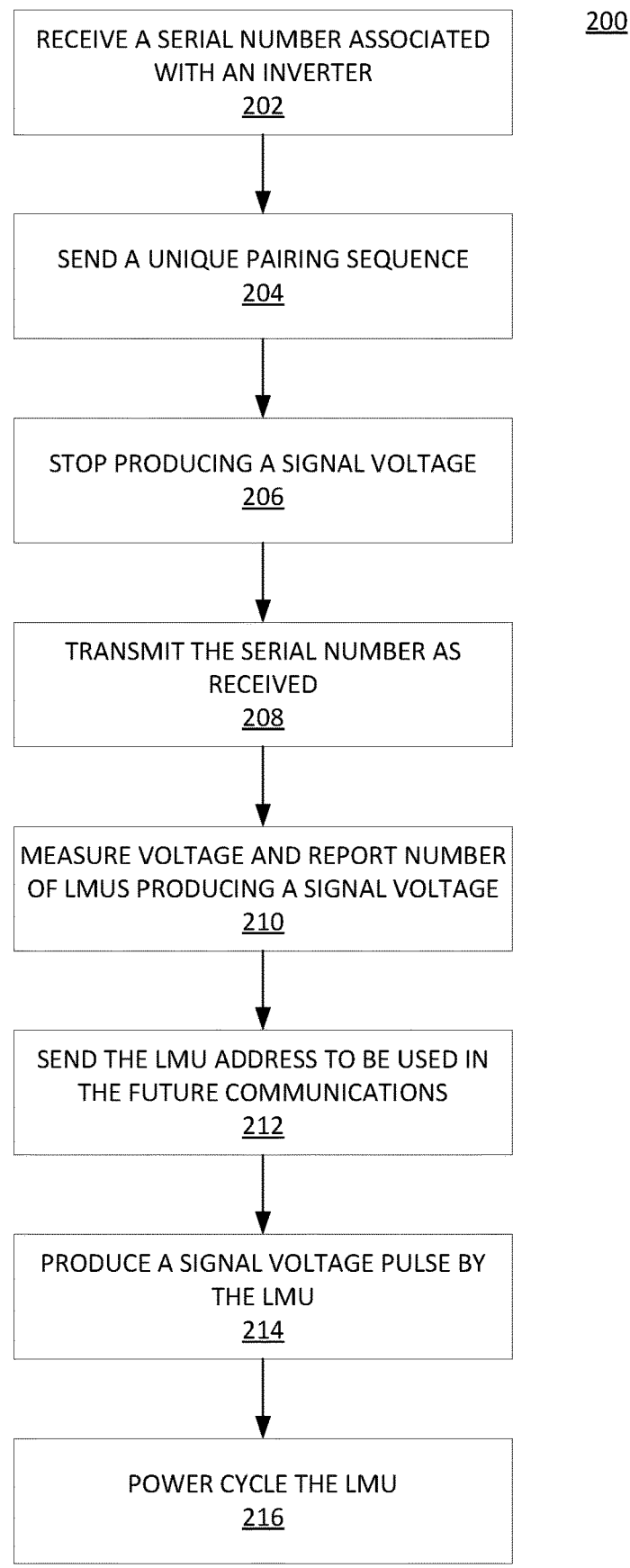
FIG. 3 shows a flowchart of a method of pairing LMUs based on pairing requests from a transmitter or inverter, according to some embodiments.

FIG. 3 shows a flowchart of a method 200 of pairing LMUs based on pairing requests from a transmitter or inverter, according to some embodiments. It is to be appreciated that the pairing requests can, in some embodiments, alternatively come from a master LMU instead of from the transmitter or inverter.

At block 202, a transmitter or an inverter can receive a serial number associated with a particular inverter or transmitter code. In some embodiments, the transmitter or inverter can receive the serial number, RFID interrogator, NFC, transceiver network MacID, or other unique identifier via input based on a serial number as printed or otherwise encoded onto a shipping box or shipping information associated with an LMU.

At block 204, the transmitter or the inverter sends a pairing sequence.

At block 206, the LMUs stop producing a signal voltage.

At block 208, the LMUs serial number or some other reply is transmitted to the inverter, transmitter, or master LMU.

At block 210, the inverter or master LMU can measure voltage and report a number of LMUs producing a signal voltage. In some embodiments, the number of LMUs can be preset in the transmitter, inverter, or master LMU. In some embodiments, the number of LMUs can be determined based on taking voltage measurements during the shutdown period and the voltage production period. In some embodiments, the number of LMUs can also be determined by measuring the signal voltage just before the pairing process begins. Comparing the signal voltage before the pairing process with a response during the pairing process can provide feedback to determine a response from responding LMUs.

At block 212, the transmitter or inverter sends an address for the LMU to use in the future. In some embodiments, the address is the transmitter or inverter address with which the LMU is paired.

At block 214, the LMU responds by producing a signal voltage pulse. In some embodiments, to distinguish the signal voltage pulse from block 210, the signal voltage pulse can include multiple pulses or a pulse of a different duration. In some embodiments, the LMU can respond and acknowledge by shorting, or discharging, the string voltage of the composite, non-responding LMUs with the MLSD's discharge FET. In some embodiments, this includes a higher signal-to-noise ratio than responding with a voltage pulse having an inverted pulse with a voltage equal to the combined string signal voltage of all of the LMUs.

At block 216, in response to pairing being complete, the LMU can turn on for a limited duration then turn off until instructed to turn on again by the inverter or the transmitter. In some embodiments, power cycling or rebooting the LMU can terminate the pairing process.

In some embodiments, one or more of block 206, block 210, or block 214 may be optional.

In some embodiments, verification of the pairing process can include verification using the signal voltage generated at block 206 will be used. In some embodiments, verification of the pairing process can include verification using the LMU transmitted serial number or some other reply represented by block 208. In some embodiments, verification of the pairing process can include verification using the wireless LMU transmitted serial number or some other reply. In some embodiments, verification of the pairing process can include verification using the PLC LMU transmitted serial number or some other reply.

In some embodiments, verification of the pairing process can use the verification blocks (206, 208, 210 and 212) for example, and can include a combination of PLC and wirelessly transmitted serial number or some other reply. In such embodiments, verification can include the transmitter or inverter communicating using a PLC signal and the LMU by using a wireless signal.

In some embodiments, the pairing process described in FIG. 3 can be done with a full solar module voltage and signal voltage. In some embodiments, the pairing process described in FIG. 3 can be done with a portion of the solar module voltage and signal voltage.

Figure 4:
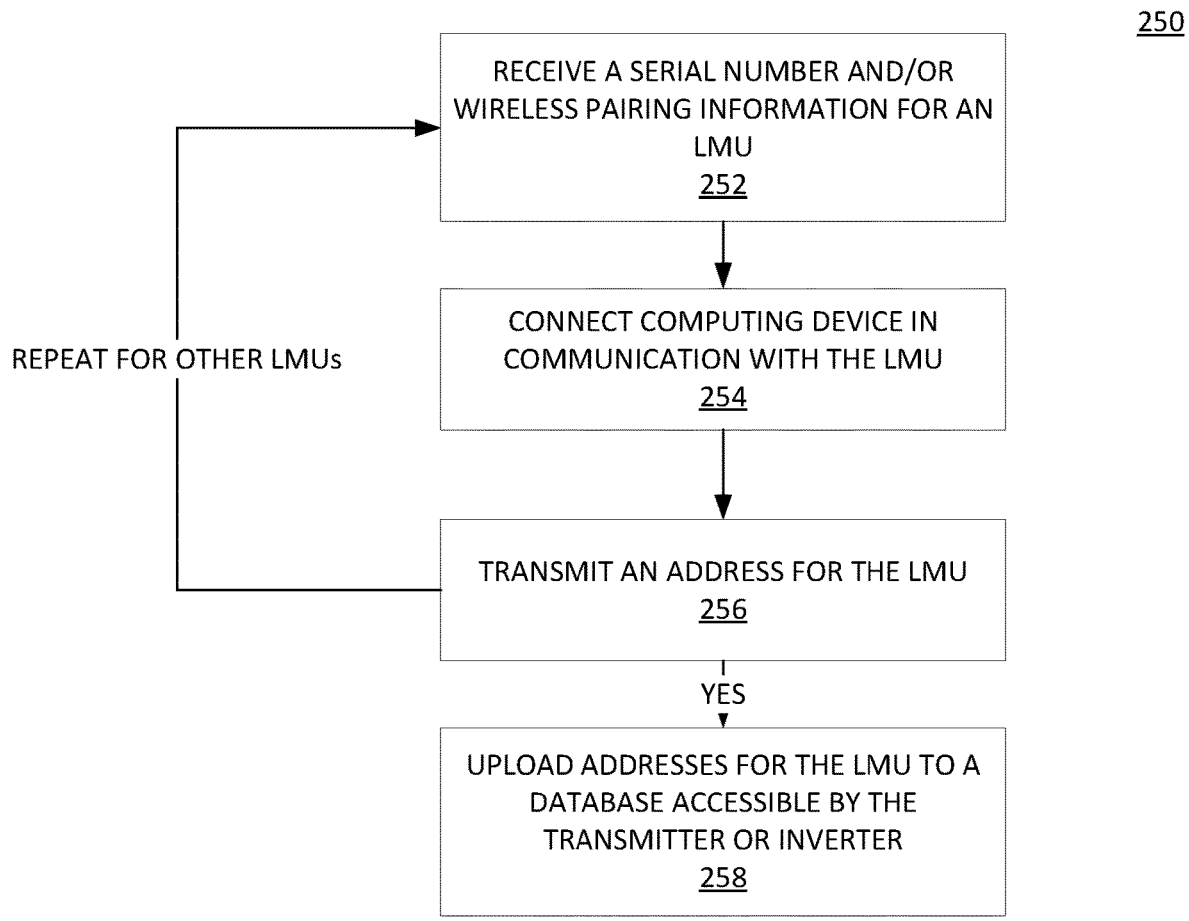
FIG. 4 shows a flowchart of a method of pairing LMUs based on pairing requests from a transmitter or inverter, according to some embodiments.

FIG. 4 shows a flowchart of a method 250 of pairing LMUs based on pairing requests from a computing device, according to some embodiments. It is to be appreciated that the computing device can, in some embodiments, be a smartphone, scanner, a dedicated computing device with wireless or PLC communication capability, contain or be an RFID interrogator, have Bluetooth capability, a master LMU, a transmitter, an inverter, combinations thereof, or the like.

At block 252, the method 250 includes receiving a transmitter serial number or some other transmitter identifying code. That code may be wireless pairing information for an LMU. In some embodiments, the serial number and wireless pairing information can be received by a computing device by, for example, scanning a code such as, but not limited to, a QR code, a barcode, a wireless transmission (e.g., Bluetooth), or the like.

At block 254, the computing device such as, but not limited to, a smartphone, a tablet device, a laptop computer, a wearable device, combinations thereof, or the like, can be connected in wireless communication with the LMU. It is to be appreciated that a wired communication method may also be possible, according to some embodiments.

At block 256, the computing device can transmit an address for the LMU to the LMU and stored in the LMU for future use.

In some embodiments, blocks 252-256 can be repeated until all LMUs in a PV system are provided with addresses for the respective LMU. In some embodiments, before connecting to a next LMU, the computing device may disconnect from the current LMU.

At block 258, the computing device can upload the address for the LMU to the transmitter, inverter, or master LMU. In some embodiments, the computing device can upload the address for the LMU to a database. The inverter, the master LMU, or the transmitter can use the database to communicate with the LMU.

Figure 5:
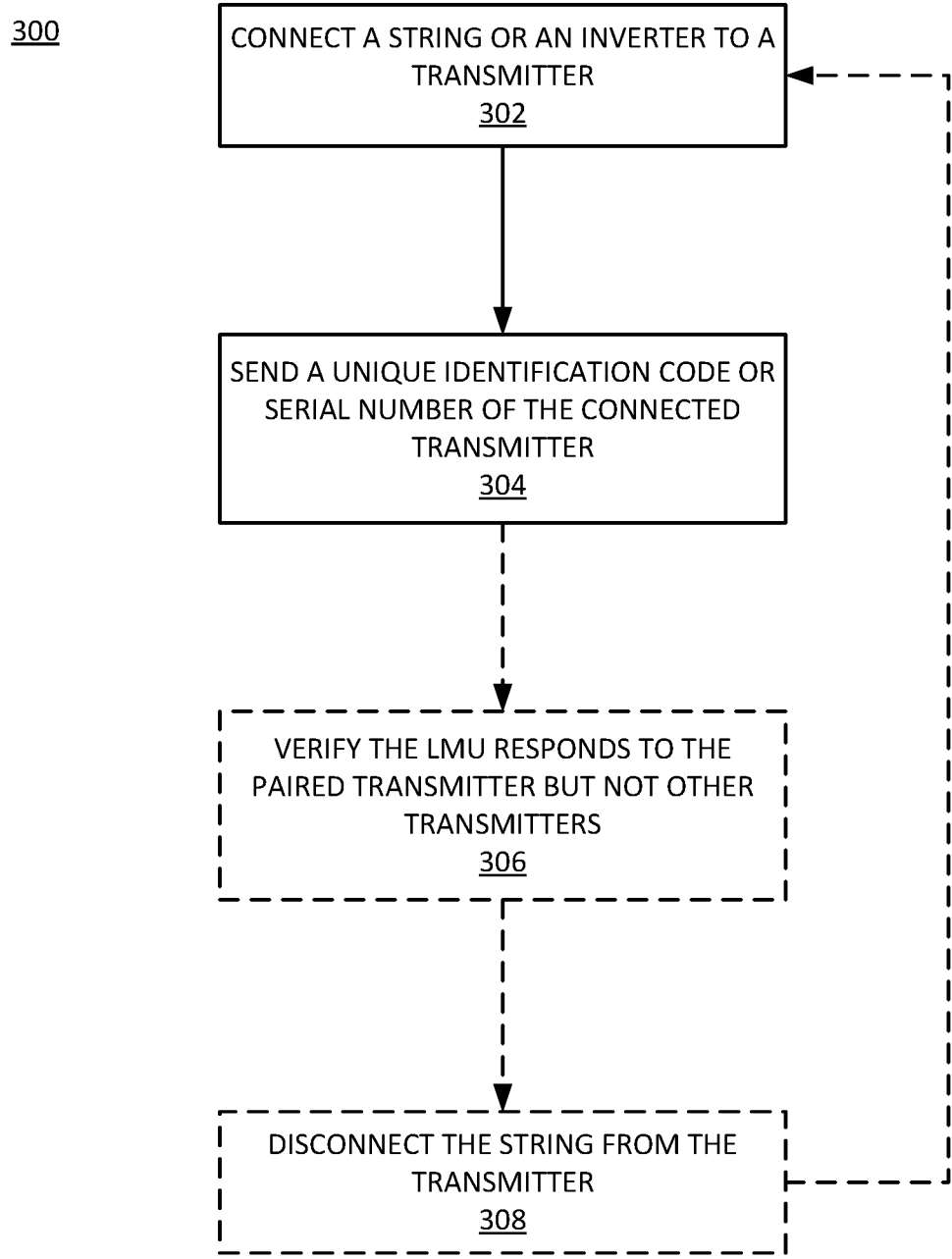
FIG. 5 shows a flowchart of a method of pairing LMUs based on pairing requests from a transmitter or inverter, according to some embodiments.

FIG. 5 shows a flowchart of a method 300 of pairing LMUs based on pairing requests from a transmitter or inverter, according to some embodiments. In some embodiments, the method 300 can include connecting a single LMU or a single string to a transmitter and then initiating a pairing sequence between the single LMU or the single string and the transmitter. In some embodiments, the pairing sequence can include connecting a single string to the inverter. In some embodiments, the LMUs can be configured to accept the pairing sequence when there is current flow in the string. In some embodiments, the LMUs can be programmed when the current in the string is above a threshold current level. In some embodiments, the method 300 can be used to initiate a pairing process.

At block 302, the method 300 can include connecting a string or an inverter to a transmitter. In some embodiments, a plurality of strings can be connected to the transmitter at a same time. In some embodiments, connecting multiple strings together can speed up the pairing process. In some embodiments, if issues arise during the pairing sequence, diagnosis of the problems may be handled on a string-by-string basis.

At block 304, the method 300 can include sending a unique identification code or serial number of the transmitter to the paired LMU associated with the string or inverter.

Optionally, in some embodiments, the method 300 can include verifying that the intended LMUs were successfully paired to the transmitter and not other LMUs (i.e., unintended) at block 306. In some embodiments, the verification process can be to confirm whether the pairing process for the individual string was effective, such as confirming that the LMU of the string responds to the paired transmitter but does not respond to other transmitters which have not been paired. In some embodiments, the verification process can be to confirm whether other strings (i.e., unintended LMU or string) respond to the transmitter.

Optionally, in some embodiments, the method 300 can include disconnecting the string from the transmitter at block 308. In some embodiments, this can be completed after the verification at block 306. In some embodiments, the verification at block 306 can come after all LMUs and transmitters are paired. In some embodiments, after disconnecting the string from the transmitter at block 308, the method 300 can be repeated until all strings in the solar array are paired with a corresponding transmitter.

In some embodiments, a string need not be paired. That is, in some embodiments, an inverter (instead of a string) can be paired with a transmitter.

Figure 6:
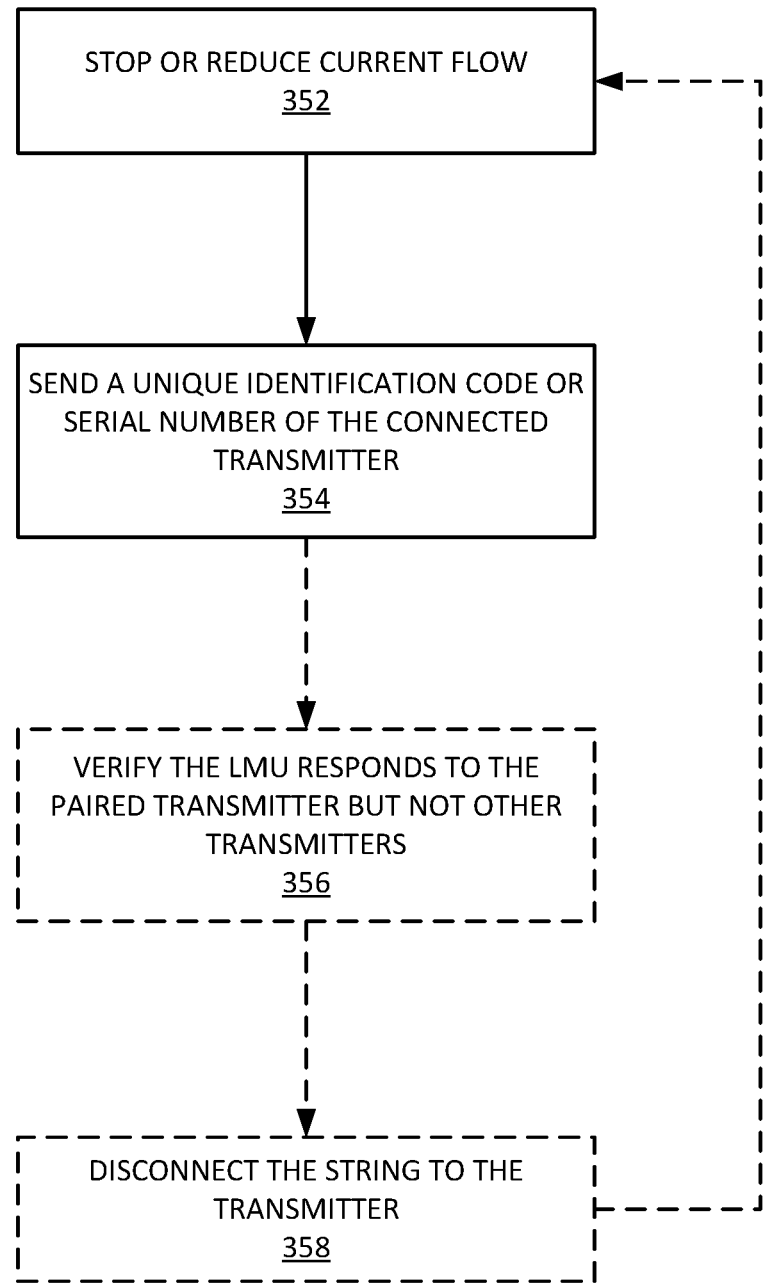
FIG. 6 shows a flowchart of a method of pairing LMUs based on pairing requests from a transmitter or inverter, according to some embodiments.

FIG. 6 shows a flowchart of a method 350 of pairing LMUs based on pairing requests from a transmitter or inverter, according to some embodiments. In some embodiments, the method 350 can include a pairing technique in which a single string is disconnected from an inverter. In some embodiments, the LMUs can be configured to accept a pairing sequence when there is no current flow in the string or when the current in the string is below a threshold current level.

At block 352, the method 350 can include connecting a string or an inverter to a transmitter and stopping or reducing a current flow.

At block 354, the method 350 can include sending a unique identification code or serial number of the transmitter to the paired LMU associated with the string or inverter.

Optionally, in some embodiments, the method 350 can include verifying that the intended LMUs were successfully paired to the transmitter and not other LMUs (i.e., unintended) at block 356. In some embodiments, the verification process can be to confirm whether the pairing process for the individual string was effective, such as confirming that the LMU of the string responds to the paired transmitter but does not respond to other transmitters which have not been paired. In some embodiments, the verification process can be to confirm whether other strings (i.e., unintended strings) respond to the transmitter.

Optionally, in some embodiments, the method 350 can include disconnecting the string from the transmitter at block 358. In some embodiments, this can be completed after the verification at block 356. In some embodiments, the verification at block 356 can come after all LMUs and transmitters are paired. In some embodiments, after disconnecting the string from the transmitter at block 358, the method 350 can be repeated until all strings in the solar array are paired with a corresponding transmitter.

In some embodiments, a string need not be paired. That is, in some embodiments, an inverter (instead of a string) can be paired with a transmitter.

In some embodiments, the pairing process described herein can mitigate crosstalk in a PLC system by sending an address specific keep-alive message to individual strings of the system.

Figure 7:
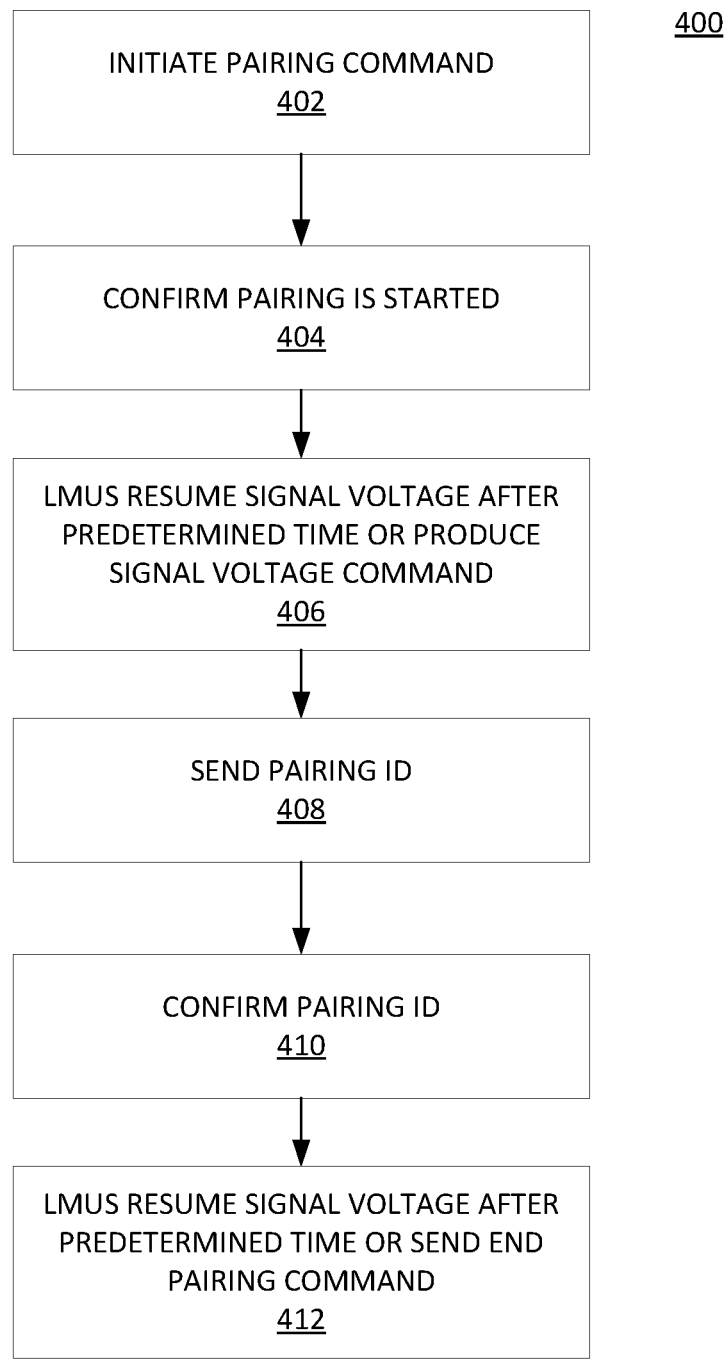
FIG. 7 shows a flowchart of a method of pairing LMUs based on pairing requests from a transmitter or inverter, according to some embodiments.

FIG. 7 shows a flowchart for a method 400 of pairing LMUs based on pairing requests from a transmitter or inverter, according to some embodiments.

In some embodiments, at block 402, a unique pattern is sent to LMUs telling them to start the paring process and prepare to accept a pairing ID from a pairing device.

In some embodiments, at block 404, the listening LMUs may respond by turning off their signal voltage for a predetermined period of time. In some embodiments, if the string signal voltage does not go to 0 V, after a predetermined time, the pairing device aborts the pairing process.

In some embodiments, at block 406, LMUs reproduce their signal voltage. In some embodiments, the pairing device measures the signal voltage and confirms whether the signal voltage matches the signal voltage level before the pairing process began to ensure that all LMUs have responded.

In some embodiments, at block 408, the pairing device sends a pairing ID to the LMUs to be paired. In some embodiments, the pairing ID is sent via serial transmission over the DC home run to the LMUs to be paired. In some embodiments, the pairing ID can be a unique ID associated with a transmitter or inverter. In some embodiments, the pairing ID can be a transmission slot number being used.

In some embodiments, at block 410, the listening LMUs may respond by turning off their signal voltage for a predetermined period of time. In some embodiments, if the string signal voltage does not go to 0 V, after a predetermined time, the pairing device aborts the pairing process.

In some embodiments, at block 412, LMUs reproduce their signal voltage. In some embodiments the pairing device measures the signal voltage and confirms whether the signal voltage matches the signal voltage level before the pairing process began to ensure that all LMUs have responded. If there is a mismatch in signal voltage, the pairing device aborts the pairing method.

Figure 8:
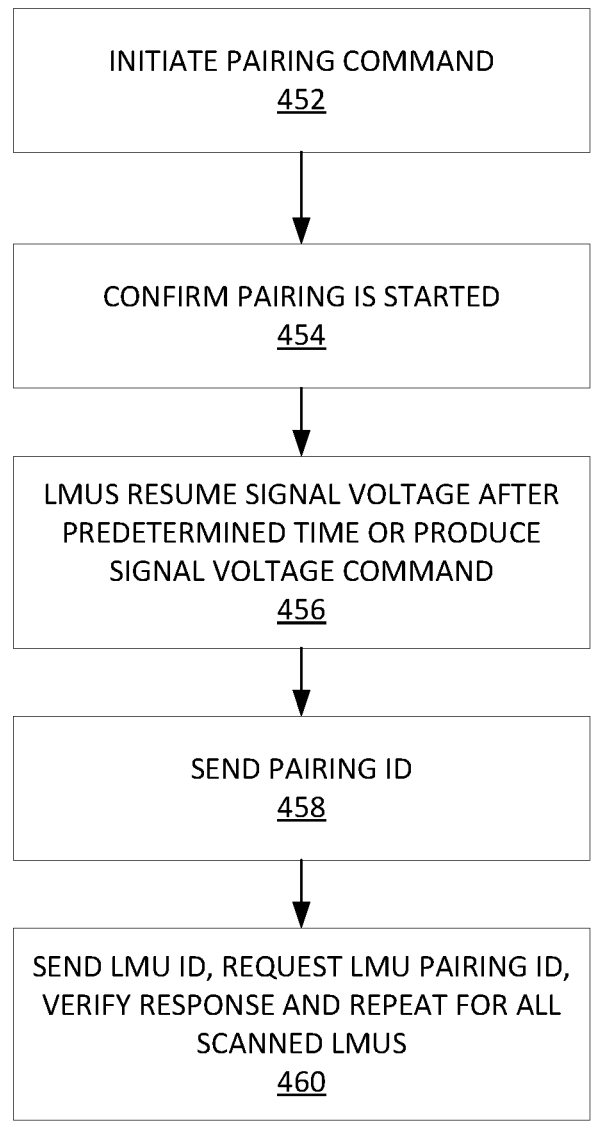
FIG. 8 shows a flowchart of a method of pairing LMUs with a pairing device based on pairing requests from a transmitter or inverter, according to some embodiments.

FIG. 8 shows a flowchart of a method 450 of pairing LMUs with a pairing device based on pairing requests from a transmitter or inverter, according to some embodiments.

In some embodiments, at block 452, a unique pattern is sent to LMUs telling them to start the paring process and prepare to accept a pairing ID from a pairing device.

In some embodiments, at block 454, the listening LMUs may respond by turning off their signal voltage for a predetermined length of time. In some embodiments, if the string signal voltage does not go to 0 V, after a predetermined time, the pairing device aborts the pairing process.

In some embodiments, at block 456, the LMUs reproduce their signal voltage. In some embodiments, the pairing device measures the signal voltage and confirms whether the signal voltage matches the signal voltage level seen before the pairing process began to ensure that all LMUs have responded.

In some embodiments, at block 458, the pairing device sends a pairing ID to the LMUs to be paired. In some embodiments, the pairing device sends the pairing ID via serial transmission over the DC home run to the LMUs to be paired. In some embodiments, the pairing ID can be a unique ID associated with a transmitter or inverter. In some embodiments, the pairing ID can also be the transmission slot number being used.

In some embodiments, at block 460, the pairing device sends the first LMU pairing ID in its list of scanned IDs, requesting that LMU to send its pairing ID. In some embodiments, the LMU responds by transmitting its pairing code via a UART connected to a FET that shorts the signal voltage on the line which is generated by non-responding LMUs. In some embodiments, if the response does not match the transmitter's pairing ID or Slot ID, the LMU is sent a command with the correct pairing ID. In some embodiments, if the pairing code matches the transmitter's pairing code, the pairing device repeats the process with the next LMU in its list of scanned IDs until all LMUs have been verified.

In some embodiments, a system, including: a transmitter configured to generate a communication signal whose modulation represents coded information to be transmitted to a local management unit connected to a photovoltaic module; and a local management unit configured to receive a communication signal whose modulation represents coded information from an inverter or a transmitter, wherein the local management unit is configured to: receive a unique pairing sequence; pair to a first transmitter or inverter; and receive communications from the first transmitter or inverter, wherein the local management unit is configured to ignore communications from a second transmitter or inverter that is not paired to the local management unit.

In some embodiments, a system, wherein the first transmitter or inverter is configured to send the unique pairing sequence a plurality of times.

In some embodiments, a system, wherein the first transmitter or inverter is configured to send the unique pairing sequence a plurality of times in a specified time window or for a specified duration.

In some embodiments, a system, wherein the local management unit is configured to determine whether the unique pairing sequence received from the first transmitter or inverter matches a pairing code.

In some embodiments, a system, wherein the local management unit is configured to start a pairing process in response to a current of a string being below a current threshold.

In some embodiments, a system, wherein the local management unit is configured to start a pairing process in response to a current of a string being above a current threshold.

In some embodiments, a system, wherein the first transmitter or inverter is configured to shut down the local management unit in response to receiving a second voltage pulse from the local management unit, the second voltage pulse representing an acknowledgment of a first address by the local management unit.

In some embodiments, a system, wherein the first transmitter or inverter is configured to receive wireless pairing information for connecting the first transmitter or inverter to the local management unit.

In some embodiments, a system, wherein the first transmitter or inverter is configured to shut down a string in a solar array via the local management unit.

In some embodiments, a system, including: a modulator configured to generate a communication signal whose modulation represents coded information to be transmitted to a local management unit connected to a photovoltaic module; and a local management unit configured to receive a power line communication signal whose modulation represents coded information from an inverter or a transmitter, wherein the local management unit is configured to: receive a unique pairing sequence; pair to a first transmitter or inverter; and receive communications from the first transmitter or inverter, wherein the local management unit is configured to ignore communications from a second transmitter or inverter that is not paired to the local management unit.

In some embodiments, a system, wherein the pairing sequence is provided through a code that can be scanned or added to the local management unit using one or more of a smartphone, a tablet device, a wearable smart device, a laptop computer, a dedicated pairing device, or combinations thereof.

In some embodiments, a system, wherein the first transmitter or inverter is configured to send the unique pairing sequence a plurality of times in a specified time window or for a specific duration.

In some embodiments, a system, wherein the local management unit is configured to determine whether the unique pairing sequence received from the first transmitter or inverter matches a pairing code.

In some embodiments, a system, wherein the inverter or a master local management unit will verify a number of local management units connected in comparison to a number of intended local management units.

In some embodiments, a system, wherein the first transmitter or inverter is configured to transmit a first address to the local management unit in response to receiving a first signal voltage pulse from the local management unit.

In some embodiments, a system, wherein the first transmitter or inverter is configured to shut down the local management unit in response to receiving a second voltage pulse from the local management unit, the second voltage pulse representing an acknowledgment of a first address by the local management unit.

In some embodiments, a system, wherein the first transmitter or inverter is configured to receive wireless pairing information for connecting the first transmitter or inverter to the local management unit.

In some embodiments, a system, wherein the first transmitter or inverter is configured to shut down a string in a solar array via the local management unit.

In some embodiments, a system, wherein the local management unit is configured to start a pairing process in response to a current of a string being below a current threshold.

In some embodiments, a system, wherein the local management unit is configured to start a pairing process in response to a current of a string being above a current threshold.

In some embodiments, a system, including: a pairing device configured to generate a communication signal whose modulation represents coded information to be transmitted to a local management unit connected to a photovoltaic module; and a local management unit configured to receive a communication signal whose modulation represents coded information from an inverter or a transmitter, wherein the local management unit is configured to: receive a unique pairing sequence; pair to a first transmitter or inverter; and receive communications from the first transmitter or inverter, wherein the local management unit is configured to ignore communications from a second transmitter or inverter that is not paired to the local management unit.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

All prior patents and publications referenced herein are incorporated by reference in their entireties.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements. Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

- disposed directly between both of the two other structural elements such that the particular structural component is in direct contact with both of the two other structural elements;
- disposed directly next to only one of the two other structural elements such that the particular structural component is in direct contact with only one of the two other structural elements;
- disposed indirectly next to only one of the two other structural elements such that the particular structural component is not in direct contact with only one of the two other structural elements, and there is another element which juxtaposes the particular structural component and the one of the two other structural elements;
- disposed indirectly between both of the two other structural elements such that the particular structural component is not in direct contact with both of the two other structural elements, and other features can be disposed therebetween; or
- any combination(s) thereof.

As used herein "embedded" means that a first material is distributed throughout a second material.

What is claimed is:

1. A system, comprising:
    a pairing device configured to generate a communication signal whose modulation represents coded information to be transmitted to a local management unit connected to a photovoltaic module; and
    a local management unit configured to receive a communication signal whose modulation represents coded information from at least one of an inverter, a transmitter, or the pairing device wherein the local management unit is configured to:
        receive a unique pairing sequence;
        pair to at least one of a first transmitter, inverter, or pairing device; and
        receive communications from the first transmitter, inverter, or pairing device, wherein the local management unit is configured to ignore communications from a second transmitter or inverter that is not paired to the local management unit.

2. The system of claim 1, wherein the first transmitter, inverter, or pairing device is configured to send the unique pairing sequence.

3. The system of claim 1, wherein the first transmitter, inverter, or pairing device is configured to send the unique pairing sequence a plurality of times in a specified time window or for a specified duration.

4. The system of claim 1, wherein the local management unit is configured to determine whether the unique pairing sequence received from the first transmitter, inverter, or pairing device matches a pairing code.

5. The system of claim 1, wherein the local management unit is configured to start a pairing process in response to a current of a string being above or below a current threshold.

6. The system of claim 1, wherein the local management unit is configured to start a pairing process in response to a current of a string being in a predetermined sequence.

7. The system of claim 6, wherein the pairing device, the local management unit, or the pairing device and the local management unit is a transceiver.

8. The system of claim 1, wherein the first transmitter or inverter is configured to receive wireless pairing information for connecting the first transmitter or inverter to the local management unit.

9. The system of claim 1, wherein the local management unit is configured to start a pairing process the first time the local management unit is powered or in response to the local management unit being powered on and off in a predetermined sequence.

10. A system, comprising:
a modulator configured to generate a communication signal whose modulation represents coded information to be transmitted to a local management unit connected to a photovoltaic module; and
a local management unit configured to receive a power line communication signal whose modulation represents coded information from an inverter, a transmitter, or a pairing device, wherein the local management unit is configured to:
receive a unique pairing sequence;
pair to a first transmitter or inverter; and
receive communications from the first transmitter, inverter, or pairing device, wherein the local management unit is configured to ignore communications from a second transmitter or inverter that is not paired to the local management unit.

11. The system of claim 10, wherein the pairing sequence is provided through a code that can be scanned or added to the local management unit using one or more of a smartphone, a tablet device, a wearable smart device, a laptop computer, a dedicated pairing device, or combinations thereof.

12. The system of claim 10, wherein the first transmitter or inverter is configured to send the unique pairing sequence and the local management unit is configured to determine whether the unique pairing sequence received from the first transmitter or inverter matches a pairing code.

13. The system of claim 10, wherein the inverter or a master local management unit will verify a number of local management units connected in comparison to a number of intended local management units.

14. The system of claim 10, wherein the first transmitter or inverter is configured to transmit a first address to the local management unit in response to receiving a first signal voltage pulse from the local management unit.

15. The system of claim 10, wherein the first transmitter or inverter is configured to shut down the local management unit in response to receiving a second voltage pulse from the local management unit, the second voltage pulse representing an acknowledgment of a first address by the local management unit.

16. The system of claim 10, wherein the first transmitter or inverter is configured to receive wireless pairing information for connecting the first transmitter or inverter to the local management unit.

17. The system of claim 10, wherein the local management unit is configured to start a pairing process in response to a current of a string being at least one of below or above a current threshold.

18. The system of claim 10, wherein the local management unit is configured to start a pairing process a first time the local management unit is powered or in response to the local management unit being powered on and off in a predetermined sequence.

19. A system, comprising:
a pairing device configured to generate a communication signal to be transmitted to a local management unit connected to a photovoltaic module; and
a local management unit configured to receive a communication signal from an inverter, a transmitter, or a pairing device, wherein the local management unit is configured to:
receive a unique pairing sequence;
pair to a first transmitter, inverter, or pairing device; and
receive communications from the first transmitter, inverter, or pairing device, wherein the local management unit is configured to ignore communications from a second transmitter or inverter that is not paired to the local management unit.

20. The system of claim 19, wherein the local management unit is configured to start a pairing process in response to a current of a string being in a predetermined sequence.

* * * * *